US006823478B1

(12) United States Patent
Prologo et al.

(10) Patent No.: US 6,823,478 B1
(45) Date of Patent: Nov. 23, 2004

(54) SYSTEM AND METHOD FOR AUTOMATING THE TESTING OF SOFTWARE PROCESSING ENVIRONMENT CHANGES

(75) Inventors: Richard D. Prologo, Redmond, WA (US); Bruce D. Katis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 09/660,044

(22) Filed: Sep. 12, 2000

(51) Int. Cl.[7] .......................... G06F 11/00; G01R 31/28
(52) U.S. Cl. ........................................ 714/38; 717/124
(58) Field of Search .............................. 714/38, 28, 27, 714/32, 48, 39, 33, 37, 45; 707/101, 1, 6; 717/124, 128, 127, 115

(56) References Cited

U.S. PATENT DOCUMENTS

| | | | | |
|---|---|---|---|---|
| 5,022,028 A | * | 6/1991 | Edmonds et al. | 714/38 |
| 5,119,377 A | * | 6/1992 | Cobb et al. | 714/38 |
| 5,758,061 A | * | 5/1998 | Plum | 714/35 |
| 5,920,830 A | * | 7/1999 | Hatfield et al. | 702/119 |
| 5,935,262 A | * | 8/1999 | Barrett et al. | 714/46 |
| 6,041,330 A | * | 3/2000 | Carman et al. | 707/101 |
| 6,269,457 B1 | * | 7/2001 | Lane | 714/38 |
| 6,347,340 B1 | * | 2/2002 | Coelho et al. | 709/246 |
| 6,427,000 B1 | * | 7/2002 | Mumford et al. | 379/9 |
| 6,490,696 B1 | * | 12/2002 | Wood et al. | 714/38 |
| 6,718,482 B2 | * | 4/2004 | Sato et al. | 714/4 |
| 2004/0059962 A1 | * | 3/2004 | Robertsson | 714/38 |

FOREIGN PATENT DOCUMENTS

| | | | | |
|---|---|---|---|---|
| JP | | 001187024 A2 | * 3/2002 | G06F/11/34 |

* cited by examiner

*Primary Examiner*—Nadeem Iqbal
(74) *Attorney, Agent, or Firm*—Law Offices of Albert S. Michalik, PLLC

(57) ABSTRACT

A system and method for automating the testing of processing environment changes are described. Input data having corresponding known-good output based on the processing of the input data in a first state of a processing environment is received by a comparison mechanism. The comparison mechanism processes the input data in a changed processing environment as compared with the processing environment in the first state. The comparison mechanism automatically evaluates the generated output against the known-good output to identify differences between the generated output and the known-good output. If no differences are found between the generated output and the known-good output, the comparison mechanism stores the generated output as the known-good output. The comparison mechanism may also generate an error log if there are differences between the generated output and the known-good output, generate an email message including the error log, and transmit the email message to a tester responsible for evaluating the error log. The generated output, the known-good output, and the error log may be formatted in an extensible markup language format. In addition, the comparison mechanism may test the generated output for compliance with another format, such as an electronic filing format.

32 Claims, 8 Drawing Sheets

| | Data Item | Data Type | Primary Key | Foreign Key |
|---|---|---|---|---|
| 642 | | | | |
| 644 | FormCode | VarChar(255) | Yes | Yes |
| 646 | NumberOfTests | Int | No | No |
| 648 | Success | Int | No | No |
| 650 | Failed | Int | No | No |
| | ByPass | Int | No | No |

| | Data Item | Data Type | Primary Key | Foreign Key |
|---|---|---|---|---|
| 662 | | | | |
| 664 | Owner | VarChar(25) | Yes | Yes |
| 666 | NumberOfTests | Int | No | No |
| 668 | Success | Int | No | No |
| 670 | Failed | Int | No | No |
| | ByPass | Int | No | No |

SYSTEM AND METHOD FOR AUTOMATING THE TESTING OF SOFTWARE PROCESSING ENVIRONMENT CHANGES

FIELD OF THE INVENTION

The present invention generally relates to computers and software, and more particularly to the testing of software.

BACKGROUND OF THE INVENTION

One competitive advantage for a successful computer software application is the ability to rapidly update the product. One of the most costly tasks associated with the updating of software is the testing phase, which is performed to ensure that the final delivered software application meets certain quality requirements and correctly incorporates the updates. For example, tax preparation software needs to frequently and rapidly change to reflect changes in tax laws, and after each such change, the software needs to be thoroughly tested to ensure that the various calculations and other information in the generated tax return correctly incorporates the changes and otherwise has no errors.

Currently, one approach for testing software applications, such as a tax preparation software application, is to have experts specializing in the area relevant to the software application use selected input data and create known, correct output results based on the input data. For example, in tax preparation software, the experts complete tax returns using appropriate sample data. Then, the experts manually compare their known, correct tax returns against the tax returns generated by the updated application using the same sample input data, to see if any differences exist. This approach is extremely labor-intensive and is prone to errors. Further, this approach requires software companies to retain a large number of personnel that specialize in areas relevant to each software application. All these factors increase the costs associated with producing the software application.

Given the above limitations, there is a need for a more efficient way to test updated software applications.

SUMMARY OF THE INVENTION

Briefly, the present invention provides a system and method for automating the testing of software processing environment changes. Processing environment changes include any form of update to software, such as an update to a calculation within a software application, a change to components of a website, such as to web pages or the like. A user, typically an expert specializing in the area relevant to the processing environment (e.g., a "tester"), creates a test representation that is assumed to be completely correct. The test representation includes sample input information, e.g., the data used to complete a tax return. The test representation may be saved as a file on a network drive. Typically, there are multiple testers each having one or more test representations. Information describing each of the test representations are input, e.g., via a website, by the testers and may be stored in a database at the website.

To test a changed processing environment, a comparison mechanism reads the information stored in the database and obtains a location for each of the test representations stored on the network drive. For each test representation, the comparison mechanism processes the inputs from the test representation and produces a generated output using the changed processing environment. The generated output is compared with a known-good output, saved in a key file, (if one exists yet) for that test representation. If the key file exists, and there are no differences resulting from the changed processing environment, i.e., the generated output matches the key file associated with the test representation, the comparison mechanism saves the generated output as a new key file and updates one or more tables. If any differences are found, an error is generated and sent to the tester, and both files (e.g., the key file and the subsequent generated output file) are saved for review by the tester. If no key file associated with the test representation exists, the generated output may be automatically saved as the key file for that test representation.

If an error has been logged against one of the tester's test representations, the tester may be notified via the Internet, such as through email. Printing and specially formatted output (e.g., electronic tax returns) are handled similarly, with special rules enforced to test the compliance (e.g., order and format) of the resultant output with the required output.

In one embodiment, the generated output file is output as an XML (extensible Mark-up Language) file. Thus, the first time the test representation is processed, the generated output file is saved as an XML key file. In this way, the comparison mechanism performs the comparison using the XML files rather than the default file format associated with the application being tested. The XML files created in accordance with the present invention need not be order dependent. Any errors for the test representation may be stored in an error file, which may also be an XML file. This XML error file allows the tester to view the errors in the error file via the web without needing to use the application associated with the upgraded processing environment.

These and other aspects of the invention, together with the benefits and advantages realized, will become apparent from a reading of the following detailed description in conjunction with the drawings, in which:

BRIEF DESCRIPTION OF THE DRAWINGS

FIGS. 6A–6D are illustrative tables used for storing information generated by the testing process of FIGS. 5A–5B.

DETAILED DESCRIPTION

Exemplary Operating Environment

Figure 1:
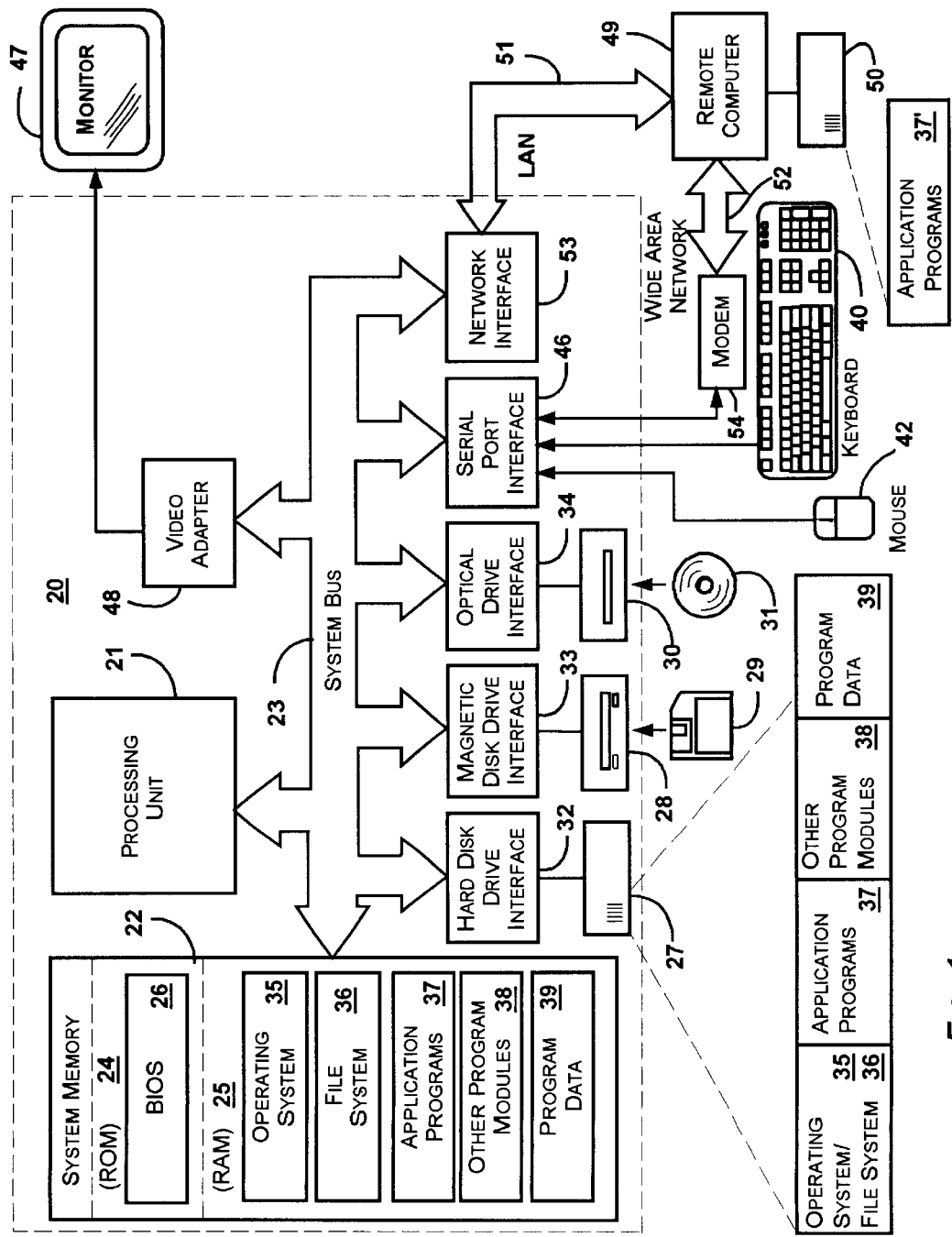
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably the Windows® 2000 operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Illustrative Automated Testing System

In accordance with an aspect the present invention, the automated testing system provides automatic testing of changes to a processing environment, such as by modifying some of the calculations within a software application. A test representation is created and is used to automatically test each processing environment change, (e.g., software build). If there are any errors, a tester associated with the test representation is notified so that the tester may perform additional checking. Thus, the tester's checking time is substantially lessened and may be used in more productive tasks, such as creating additional tests. In addition, the present invention is less prone to human errors. While the following discussion describes the automated testing system in the context of changes to tax calculations in a tax preparation software application, the automated testing system may also test changes to other processing environments such as changed web pages or the like that when rendered, are suppose to produce some known content.

Figure 2:
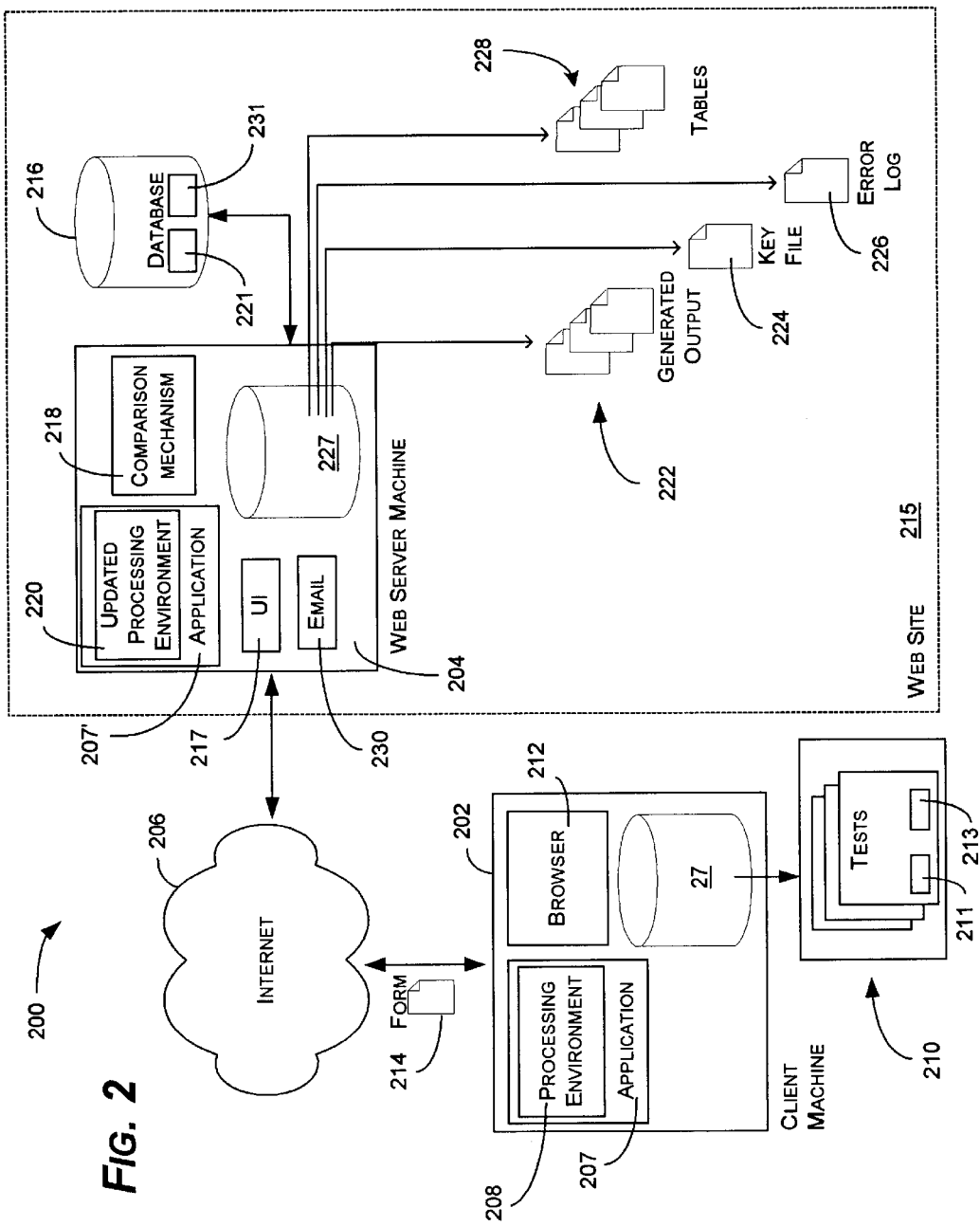
FIG. 2 is a functional block diagram generally representing an illustrative automated testing system for testing a changed processing environment in accordance with one aspect of the present invention.

FIG. 2 is a functional block diagram that, together with the following discussion, provides a brief, general description of an illustrative automated testing system for testing a changed processing environment in accordance with one aspect of the present invention. The automated testing system 200 may include a client machine 202 (e.g., the computer system 20) coupled to a Web server machine 204 (e.g., the remote computer 49). The client machine 202 and the Web server machine 204 communicate with each other through the Internet 206. Alternatively, the client machine 202 and the Web server machine 204 may be connected through a local area network or the like (e.g., in an Intranet).

A tester, typically an expert specializing in the area relevant to a particular processing environment 208 (e.g., tax preparation and calculations), uses an application 207 associated with the processing environment 208 to create one or more test representations 210 on the client machine 202. The test representations 210 include input data 211, and possibly include corresponding known-good output results 213 based on the processing environment 208, e.g., for saving to a key file associated with this test representation. Each of the test representations 210 is assumed to be completely correct. The test representations 210 may be saved as a file on a network drive (e.g., hard disk 27). As one can appreciate, there may be multiple testers each creating one or more test representations 210 using one or more client machines 202.

The Web server machine 204 located at a test site, e.g., test website 215, includes an updated processing environment 220, e.g., associated with a different application version 207' of the application 207, a comparison mechanism 218 and a user interface 217. In general, in one embodiment illustrated in FIG. 3 and described below, the user interface 217 may appear as a form 214 when received at the client machine 202 and processed by the browser 212. The form 214 provides a tester with a mechanism for inputting information regarding each test representation 210 on the client machine 202 to an associated profile 221, which may be stored in a database 216 at the test website 215. The comparison mechanism 218, illustrated in detail in FIGS. 5A–5B and described below, accesses the profiles 221 in the database 216 to get the information regarding each test representation 210. The comparison mechanism 218 also enters the inputs 211 provided via the form 214 into the application 207'. The application 207' then generates outputs (e.g., generated outputs 222) based on the inputs 211. Each of the generated outputs 222 correspond to one of the test representations 210 after processing by the comparison mechanism 218. For each of the test representations 210, the comparison mechanism 218 compares the generated output 222 with the known-good output as saved in a key file 224, (if one exists) associated with that test representation 210. If the generated output 222 matches the known-good output as saved in the key file 224, the comparison mechanism 218 saves the generated output 222 as a new key file, as described below. Note that as described below, the match need not be exact, e.g., it may be considered as having no differences if the order has changed but otherwise the results match. Also, the results may otherwise match excluding new information added to the new results, whereby a different type of error may be generated. For example, in a tax return, a new form that is generated may not be considered a calculation error if that new form has no impact on the various calculations, but instead may yield an error that notifies the tester that a new form was introduced. The comparison mechanism 218 may additionally update one or more tables 228 to reflect the results of processing performed by the comparison mechanism 218. Various illustrative tables used by the system for storing and monitoring information are illustrated in FIGS. 6A–6D and described below.

If any differences are found between the generated output 222 and the key file 224, an error log 226 is generated and sent to the tester for review. The generated output 222, key files 224, error log 226 and the result tables 228 may be stored on the hard disk 227 of the Web server machine 204 or may be stored on any other storage device coupled to the Web server machine 204.

In one embodiment, the Web server machine 204 further includes an email service 230 responsible for notifying the testers of any errors in the error log 226 that are associated with the tester's test representations 210. As one skilled in the art will appreciate, the email service 230 may be part of an operating system, part of a browser application, or a stand-alone application.

Figure 3:
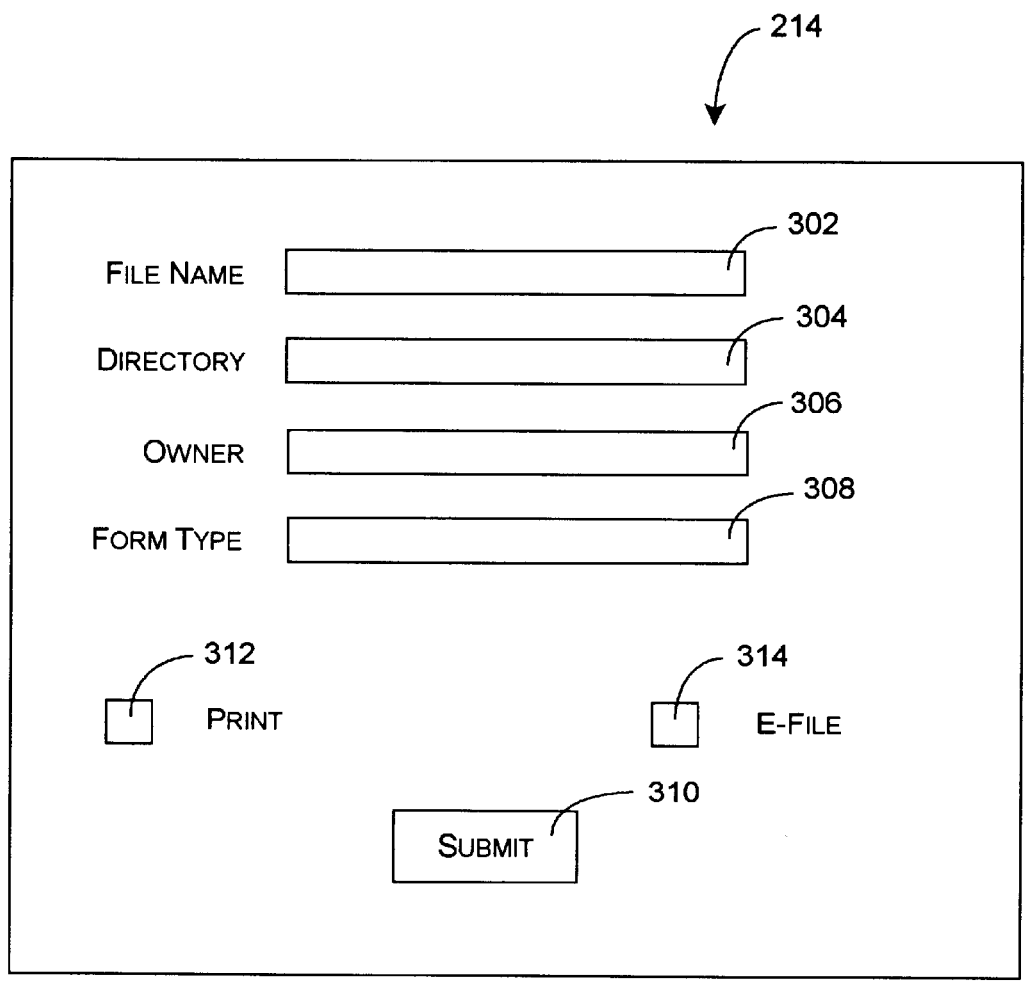
FIG. 3 is a graphical representation of one embodiment of a user interface used to submit information concerning a test representation to a testing site.

FIG. 3 is a representation of one embodiment of a form 214 used to submit information about a test representation 210 to a testing website 215. In this embodiment, the form 214 includes textual input fields for supplying information. The representative form 214 may have several textual input fields, such as a filename field 302, a directory field 304, an owner field 306, and a form type field 308. The filename field 302 provides a location for the tester to input the name of the test representation file 210 stored on the network drive. The directory field 304 provides a location for the tester to input a drive name and a path for the test representation file listed in the filename field 302. Briefly, the filename field 302 and the directory field 304 are used by a process of the comparison mechanism, illustrated in FIGS. 5A–5B and described further below, to access the associated test representation 210. The owner field 306 provides a location for the tester to input an owner name, such as an email address or the like. The owner name listed in this field is notified if an error occurs during the processing by the comparison mechanism 218. The form type field 308 provides a location for the tester to input a code that identifies the type of the test representation. For example, if a tax application is being tested, the form code field may specify whether the data corresponds to a personal tax return or a business tax return, and so on. In addition, the form 214 includes a submit button 310 that may be selected by the tester to transfer the information identified on the form 214 to the test Web site 215 for processing and storing as one of the profiles 221. An ASP (Active Server Page) acting as a wizard may be used to allow the testers to enter new profiles. In addition, the form may allow previous test representations to be searched, deleted, and modified.

Optionally, the form 214 may further include a print selection box 312 and an e-file selection box 314. Briefly, the tester selects the print selection box 312 to indicate whether the comparison mechanism 218 prints results in a specified format, such as Internal Revenue Service (IRS) specified format. Alternatively, the tester may select the e-file selection box 314 to indicate whether the comparison mechanism 218 should translate the results into an IRS electronic filing format. Note that this information is used by the comparison mechanism to make sure the generated output precisely matches IRS requirements, e.g., printed forms must "print out" (although as test cases they are not necessarily physically printed) in the correct order, while data output for an electronic filing format must be formatted exactly as required.

Additional selection boxes (or other input mechanisms) may be provided. For example, a selection box specifying "Acceptance Test" can be selected to run only a portion of the tests. This may be beneficial in certain situations, such as if the entire process takes many hours, e.g., an "Acceptance Run" can be conducted in a shorter period of time giving a high-level acceptance to the new application version, prior to conducting a full run. Likewise, a selection box can also address other application features, such as requesting spell checker passes on the output files.

Figure 4:
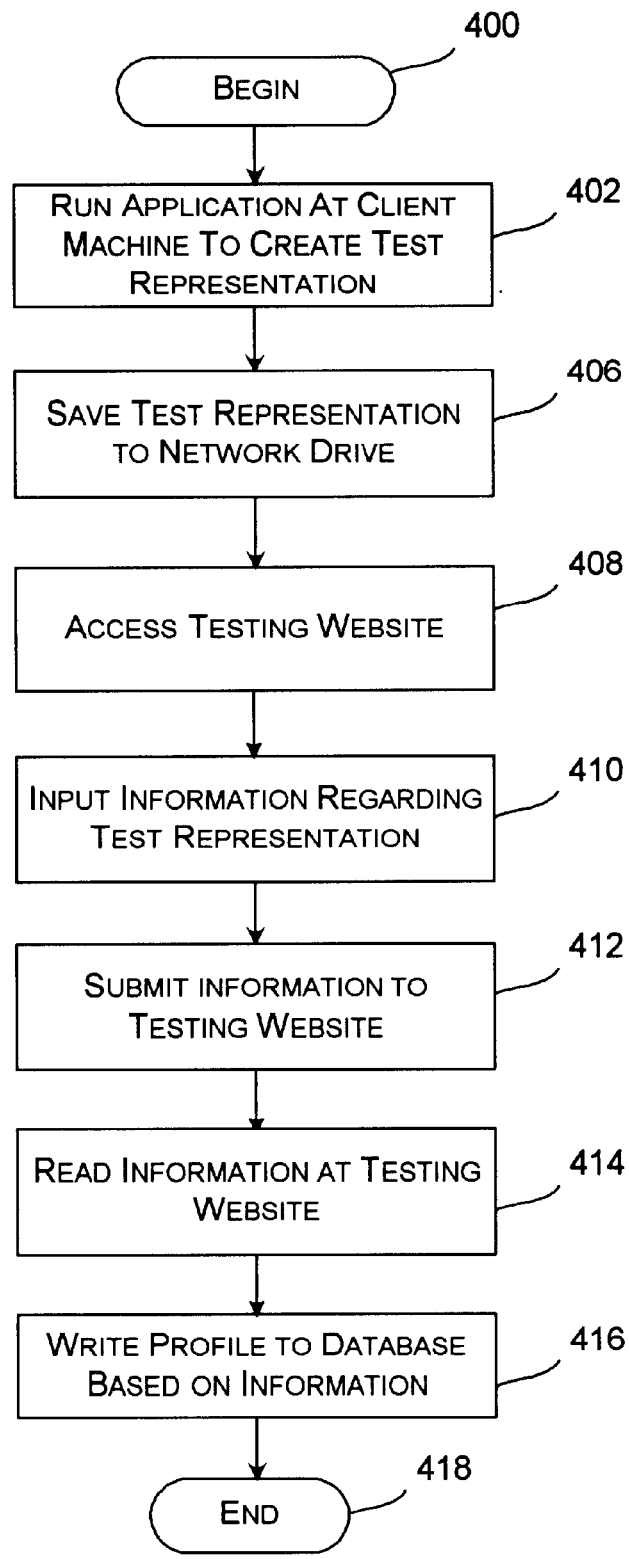
FIG. 4 is a logical flow diagram which generally describes a process for creating a test representation for the automated testing system in accordance with one aspect of the present invention.

FIG. 4 is a logical flow diagram which generally describes a process performed by the testers to provide a test representation 210 to the automated testing system 200 in accordance with one implementation of the present invention. The process begins at block 400, where a tester chooses to create a profile 221 at the testing website 215, and proceeds to block 402.

At block 402, the tester runs the application 207 which is to undergo one or more changes (e.g., updates) during development. Using a user-interface provided by the application 207, the tester creates a test representation 210 that is written in a default file format of the application (e.g., an "mtx" file for a TaxSaver tax preparation software application). The test representation 210 includes inputs 211 determined by the tester and known-good outputs 213 calculated by the application 207 based on the inputs 211. The tester is responsible for verifying that the inputs 211 and known-good outputs 213 are correct for the test representation 210 and thus, that the test representation 210 is correct. As one skilled in the art will appreciate, before the test representation 210 can be correct, the application 207 is presumed to have passed a quality check so that the application 207 will not introduce any unknown errors into the test representations 210. After creating the test representation 210, the process proceeds to block 406.

At block 406, the test representation 210 is saved to a network drive. In one embodiment, the network drive is accessible to the testing website 215 for reading and perhaps writing an updated test representation to the network drive, such as the updated test representation being created using the updated application 207' with the updated processing environment 208. The process proceeds to block 408, where a tester accesses a testing website 215 using a browser capable service 212 that communicates with the testing website 215 via a network, such as the Internet 206 or an intranet. In one embodiment, the browser 212 translates the user interface 217 provided by the web server machine 204 into a form, such as form 214, for display at the client machine 202. After accessing the testing website 215, the process proceeds to block 410.

At block 410, the tester inputs information regarding the test representation 210 created in block 402. In one embodiment, the information is entered on the form 214 provided by the testing Website 215, as illustrated in FIG. 3 and described above.

At block 412, the information input on the form 214 is submitted to the testing Website 215, and the process proceeds to block 414, where the Web server 204 reads the information. The Web server 204 then writes the information, at block 416, into one of the profiles 221 stored in the database 216. Briefly, the profile 221, illustrated in FIG. 6A and described below, contains the information input by the tester in block 410, thus the profile points to the physical drive location for each test representation. The create profile process then ends.

Figure 5A:
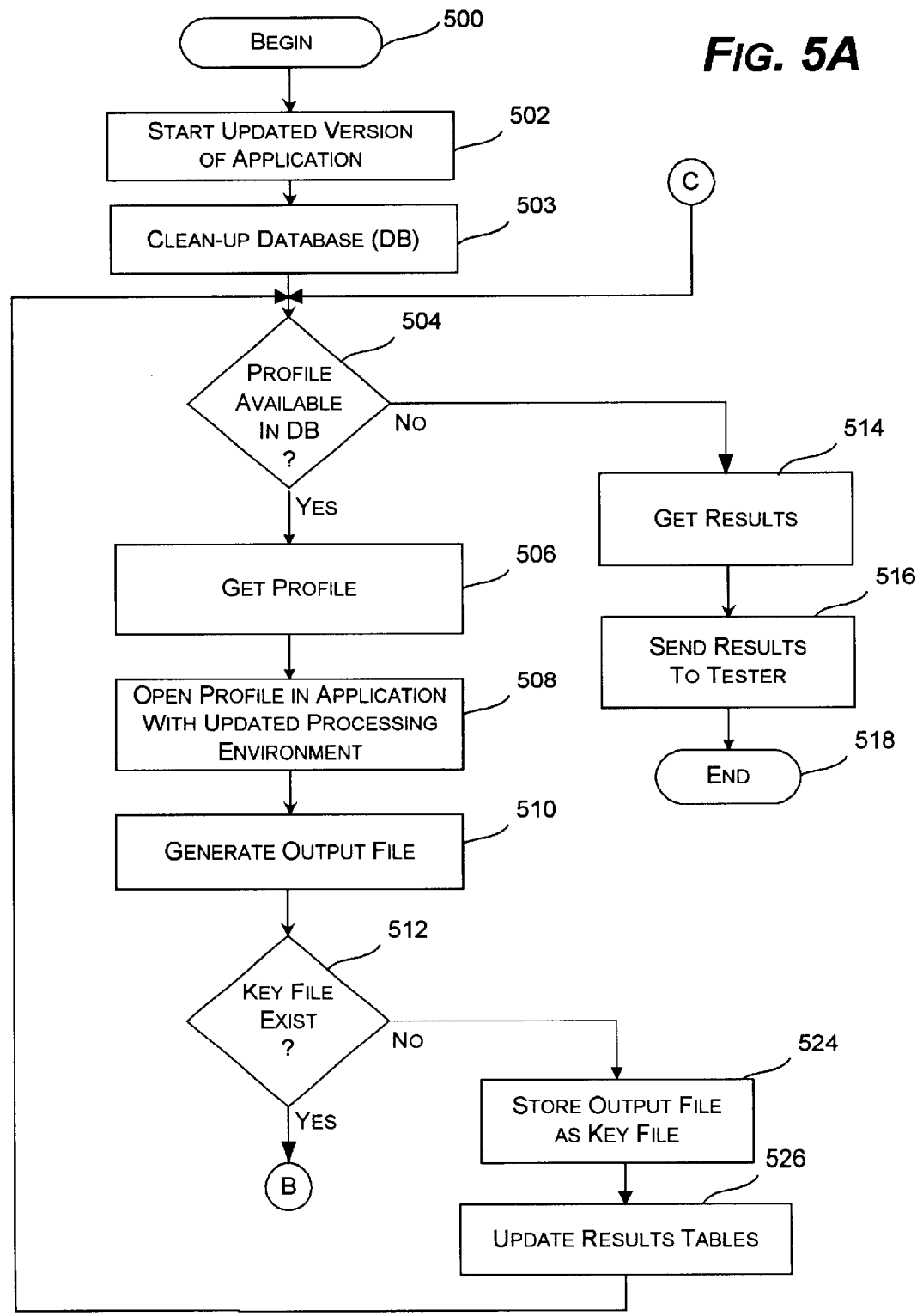
FIGS. 5A–5B are logical flow diagrams which generally describe a testing process for comparing output generated using a prior processing environment with output generated using an upgraded processing environment in accordance with one aspect of the present invention.
Figure 5B:
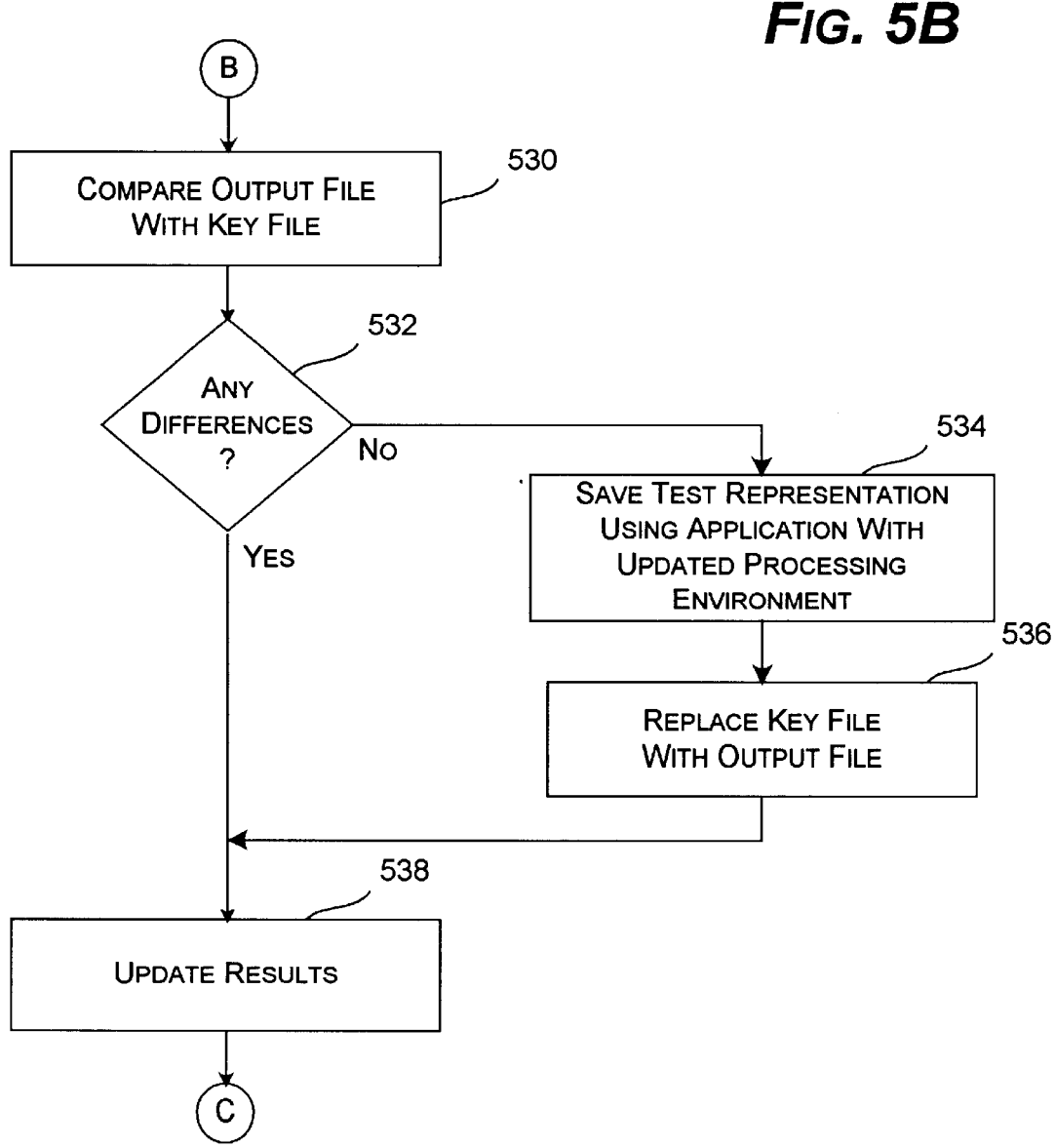

FIGS. 5A–5B are logical flow diagrams which generally describe a testing process (e.g., of the comparison mechanism 218) for comparing output generated from a prior processing environment with output generated by a changed processing environment, in accordance with one implementation of the present invention. The process begins at block 500, where the automated testing system has been started such as automatically during a boot-up process, by a timed process or manually through a user interface, and proceeds to block 502.

Figure 6A:
Figure 6B:
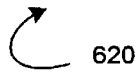

At block 502, the latest build of the processing environment (e.g., an updated version of an application) is started and the process proceeds to block 503. At block 503, the comparison mechanism 218 may optionally update its database 216 such as to remove a profile from the database that was marked as deleted by one of the testers. One exemplary table is illustrated in FIG. 6B and described in further detail below. The process proceeds to decision block 504.

At decision block 504, the process determines whether there are any profiles 221 in the database 216. In one embodiment, the process issues a SQL statement to the database 216 to locate the profiles that are not set to "ByPass." Briefly, ByPass is a field within a test table used to indicate whether the associated test representation should be run by the comparison mechanism 218. One sample test table showing the ByPass field is illustrated in FIG. 6A and described further below. As long as there is at least one profile 221 available, the process proceeds to block 506, where a profile 221 is retrieved from the database 216. The process then proceeds to block 508.

At block 508, the test representation specified in the retrieved profile 221 is opened using the updated version of the application 207'. Using the inputs specified in the test representation, the updated version of the application 207' generates an output file at block 510. At this point, in one embodiment, the output file has the default file format associated with the updated version of the application (e.g., an "mtx" file extension for a TaxSaver tax preparation software application). The process proceeds to decision block 512.

At decision block 512, the process determines whether a key file associated with the current profile exists. The first time the profile is processed, a key file does not exist so the process proceeds to block 524, where the generated output file is saved as the key file. This key file (e.g., created with the prior processing environment) will then be used for comparing subsequent generated output files (e.g., created with the changed processing environment). The process proceeds to block 526, where one or more of the results tables are updated. The process then loops back to decision block 504 and continues processing as described above on another profile or until no more profiles remain.

Returning to decision block 512, after the initial processing of the profile to create a key file, any subsequent processing of the profile proceeds to block 530 (entry point B) of FIG. 5B. At block 530, the output file is compared with the key file. If there are any differences between the two files, the process proceeds from decision block 532 to block 538. At block 538, the process updates any tables as appropriate to identify the difference, such as the sample result table illustrated in FIG. 6B and described below. However, if there are not any differences, the process proceeds to block 534, where the test representation specified in the associated profile is saved using the updated version of the application 207'. Thus, if the earlier test representation was stored on the hard disk of the client machine, the new test representation may be stored at the test Website and the source field in the test table, (illustrated in FIG. 6A and described below), is modified to reflect the change in the location. The process then proceeds to block 536.

At block 536, the output file becomes the key file, such as by copying the output file as the key file. Thus, the "new" key file will get a new date and time stamp corresponding to the date and time of the latest successful processing environment change. This allows the testers to easily and visually determine on which day the processing environment change affected their test representations. In addition, by copying the output file as the key file, any new calculations specified in the test representation that resulted in additional outputs will be saved in the key file for later comparisons. The process then proceeds to block 538 to update the results as described above, after which the process loops back to decision block 504 (entry point C) in FIG. 5A and proceeds as also described above.

Returning to decision block 504 in FIG. 5A, once all the profiles in the database have been processed, the process proceeds to block 514. At block 514, the results are retrieved from any of the results tables and may, optionally, be sent to the tester at block 516. In one embodiment, the results may be emailed to the tester via the Internet 206 in a human-readable format, such as an XML format. For example, the comparison mechanism 218 may send one email message to each tester for any test representations owned by that tester. Thus, each tester will receive an email for each test representation owned thereby. The tester is responsible for determining the source of the error and informing the comparison mechanism's process about the determination. For example, the tester may verify that there is a discrepancy in the test representation that has not yet been corrected, may update the test representation to overcome the discrepancy (resulting in this test representation becoming the "new" key file), or may remove the test representation from further processing by the comparison mechanism 218. The process then ends at block 518. When another processing environment change occurs, the "new" processing environment is used to produce the generated output and proceeds as described above.

In an alternative embodiment, at block 510, instead of using the default file format of the application, the process converts the default file format into an hierarchical XML format. For this embodiment, another database (form database 231 in FIG. 2) may be accessed to obtain a file based on the type of form specified in the profile for the test representation. Each form available in the other database may list the forms included in the file, list their respective field entries, list an associated attribute (e.g., input, calculated, override, and the like), list an input type (e.g., money, string, ratio, multi-line object, and the like), and a value. For example, one file may list the 1040 form with field "income", attribute as "input", input type as "money", and value as "$40,000".

In addition, a Document Type Definition (DTD) or XML schema may be created that defines how the markup tags in the XML file are interpreted. The data in the default file format is then translated into the proper format as specified by the form. Therefore, when the generated file is saved as the key file at block 536, the key file also is in XML format. The comparison process in block 530 (FIG. 5B), then compares the two XML files (e.g., the XML output file and the XML key file) without depending on the exact order of the file. For example, the comparison may proceed by "walking" the key file against the output file, meaning that each field, attribute, and value are checked to determine whether any of the values have changed. Furthermore, the comparison may compare the list of forms in the output file with the list of forms in the key file. For any additional forms, an error may be logged and sent to the tester for proper action. Appendix A is one example of an actual XML form of type "1040" for a tax preparation software application. The output file and the key file would thus have similar formats with actual data stored in their respective files. Ultimately, the XML files may be sent to the United States Internal Revenue Service for processing via the Web.

This alternative embodiment allows the error log to easily be generated in an XML format. Thus, if the errors are sent via email, the email message may have a pointer to the XML error log which allows the tester to view the errors on the Web in an understandable, readable manner. In addition, the XML key file and XML output file may be sent to the tester for convenient viewing. Appendix B is one example of an actual error log in XML format. Briefly, the error log shows that test representation "tested 1040_sample.xml" with its associated key file in the key file directory has the following differences: a value of 99 rather than 100 in the Form 2210, Underpayment of Estimated Tax; a value of 12 rather than 15, and a value of 6 rather than 7 in the Penalty Calculation Statement (Form 2210); and a value of 20000 rather than 21000 in two fields in the Form 2210-F, Underpayment of Estimated Tax by Farmers and Fisherman. For this alternative embodiment, the comparison mechanism may be less intelligent about the structure of the default file format and if the default file format changes, the comparison mechanism will not be greatly impacted. In addition, this alternative embodiment does not require the tester to run the software application with the updated processing environment in order to determine the errors.

FIGS. 6A–6D are illustrative tables used for storing information generated by the testing process of FIGS. 5A–5B. FIG. 6A illustrates a first table 600 for storing information about each specific test representation (e.g., a profile). A FileName field 602 stores the name of the file used to test the validity of the changed processing environment. A Source field 604 stores the physical location for the file specified in the FileName field 602. A Destination field 606 stores the physical location for the output file generated by the processing shown in FIGS. 5A–5B. A FormCode field 608 stores the type of form for the test representation (e.g., the form type as specified by the tester via the form 214). A Key field 610 stores the file name and physical location of the file which will be compared with the file specified in the Filename Field 602 and the Source Field 604. A ByPass field 612 stores an indicator signaling whether the comparison mechanism should process the test representation associated with this entry. An owner field 614 stores an email address for the tester responsible for the test representation associated with this entry. In the illustrative first table, the ByPass field 612 accepts an integer while other fields accept strings (e.g., VarChar(255)).

FIG. 6B illustrates a second table 620 for storing information about each test representation that failed the comparison mechanism's evaluation process. The second table 620 includes a FileName field 622, a Source field 624, an Owner field 626, and a FormCode field 628 storing the same information as described above for FIG. 6A for fields having the same name. In addition, the second table 620 includes a Delete field 630 for storing a flag indicating whether a tester desires to delete the associated test representation from the database, and a TimeStamp field 632 for storing the time that the comparison mechanism 218 completed processing the test representation.

FIG. 6C illustrates a third table 640 for storing information about each test representation that failed the comparison mechanism's evaluation process based on the type of form. Again, the third table 640 includes fields similar to fields in the first table 600, such a FormCode field 642, and a ByPass field 650. In addition, the third table 640 includes a NumberOfTests fields 644 for storing a value representing the number of test representations that used the form specified in the FormCode field 642. The third table 640 also includes a Success field 646 for storing a value representing the number of test representations that successfully passed the comparison mechanism's process for the form specified in the FormCode field 642. In addition, the third table 640 includes a Failed field 648 for storing a value representing the number out of the NumberOfTests field 644 that failed the comparison mechanism's process. The third table 640 may be used to identify potential errors with the changed processing environment so that testers may be alerted that the upgraded software application may have an error rather than their test representations.

FIG. 6D illustrates a fourth table 660 for storing information about each test representation that failed the comparison mechanism's process based on the tester. The fourth table 660 includes fields similar to fields in the first table 600 and the third table 640, such as an Owner field 662, a NumberOfTests fields 664, a Success field 666, a Failed field 668, and a ByPass field 670. The NumberOfTests fields 664 stores a value representing the number of test representations having the tester listed in the Owner field 660. The fourth table 660 may be used when sending an email message to the tester with the results of the comparison mechanism process.

While the invention is susceptible to various modifications and alternative constructions, certain illustrated embodiments are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
   receiving a test representation, the test representation having input data created by a tester and corresponding known-good output based on the processing of the input data in a first software processing environment;
   processing the input data within a second software processing environment to generate output data, the second software processing environment including at least one change from the first software processing environment; and
   automatically evaluating the generated output against the known-good output using a checker process to identify differences between the generated output and the known-good output.

2. The computer-implemented method of claim 1 wherein if there are no differences between the generated output and the known-good output, storing the generated output as the known-good output.

3. The computer-implemented method of claim 1, further comprising generating an error log if there are differences between the generated output and the known-good output.

4. The computer-implemented method of claim 3, wherein the error log is formatted in an extensible markup language format.

5. The computer-implemented method of claim 3, further comprising reporting the error log.

6. The computer-implemented method of claim 5, wherein reporting the error log comprises transmitting an email message including the error log.

7. The computer-implemented method of claim 6, wherein the email message further includes the known-good output and the generated output.

8. The computer-implemented method of claim 1, wherein the generated output and the known-good output are formatted in an extensible markup language format.

9. The computer-implemented method of claim 1, further comprising testing the generated output for compliance with another format.

10. The computer-implemented method of claim 9, wherein the other format includes an electronic filing format.

11. The computer-implemented method of claim 9, wherein the other format includes a print format.

12. The computer-implemented method of claim 1, wherein the processing environment comprises a software application.

13. The computer-implemented method of claim 12, wherein the generated output is based on a default file format of the software application.

14. A computer-readable medium having computer-executable components for testing software processing environment changes, comprising:
   a creation component configured to generate one or more test representations, each test representation including input data created by a tester;
   a user-interface component configured to provide information about each test representation to a testing site; and
   a checker component configured to:
      read the information about each test representation;
      generate output data using the software processing environment in a second state for each of the test representations having information at the testing site, the second state of the software processing environment reflecting a change from the first state of the software processing environment;
      evaluate the generated output against known-good output to identify differences between the generated output and the known-good output; and
      generate an error if there are differences between the generated output and the known-good output.

15. The computer-readable medium of claim 14, wherein the checker component is further configured to store the generated output data as the known good-data if there are no differences between the generated output and the known-good output.

16. The computer-readable medium of claim 15, wherein the checker component is further configured to generate an error log indicative of the error, and to transmit an email message including the error log to a tester.

17. The computer-readable medium of claim 16, wherein the error log is formatted in an extensible markup language format.

18. The computer-readable medium of claim 14, wherein the generated output and the known-good output are formatted in an extensible markup language format.

19. A testing system, comprising:
   a server coupled to a storage media;
   a checker process configured to access information stored on the storage media, the information describing one or more test representations, each test representation including input data created by a tester and associated with corresponding known-good output generated with a software processing environment in a first state; and
   a changed software processing environment that reflects at least one change to the software processing environment in the first state,
   wherein the checker process, in conjunction with the changed software processing environment, is further configured to
      generate an output for each of the test representations identified in the information,
      evaluate the generated output against the known-good output to identify differences between the generated output and the known-good output, and
      store the generated output as the known-good output if there are no differences between the generated output and the known-good output.

20. The testing system of claim 19, further comprising a client coupled to the server, the client comprising the software processing environment in a test state configured to generate the one or more test representations and to supply the information describing the test representations to the server.

21. The testing system of claim 20, wherein the test state comprises the first state.

22. The testing system of claim 19, further comprising a notification process residing on the server for reporting results based on the checker process evaluation of the generated output against the known-good data.

23. The testing system of claim 22, wherein the results are formatted in an extensible markup language format.

24. The testing system of claim 19, wherein the generated output and the known-good output are formatted in an extensible markup language format.

25. The testing system of claim 19, wherein the software processing environment comprises a software application.

26. The testing system of claim 25, wherein the generated output is based on a default file format of the software application.

27. The testing system of claim 19, wherein the software processing environment comprises a web page.

28. A computer-implemented method, comprising:

receiving input data created by a tester;

processing the input data using a changed software processing environment to generate output;

automatically evaluating the generated output against known good data using a checker process; and reporting the results of the evaluation.

29. A testing system, comprising:

means for executing a changed version of a software application using input data created by a tester;

means for generating output from the execution of the changed version of the software application using the input data; and means for automatically evaluating generated output from the execution of the changed version of the software application using the input data against known-good output generated from a prior execution of the software application.

30. The system of claim 29 wherein the means for executing a changed version of the software application using input data created by a tester comprises means for creating a test representation having input data created by the tester and know-good output from a execution of the software application using the input data.

31. The system of claim 29 further comprising means for reporting the results of the evaluation.

32. The system of claim 30 further comprising means for saving the test representation.

\* \* \* \* \*